Figure 1:
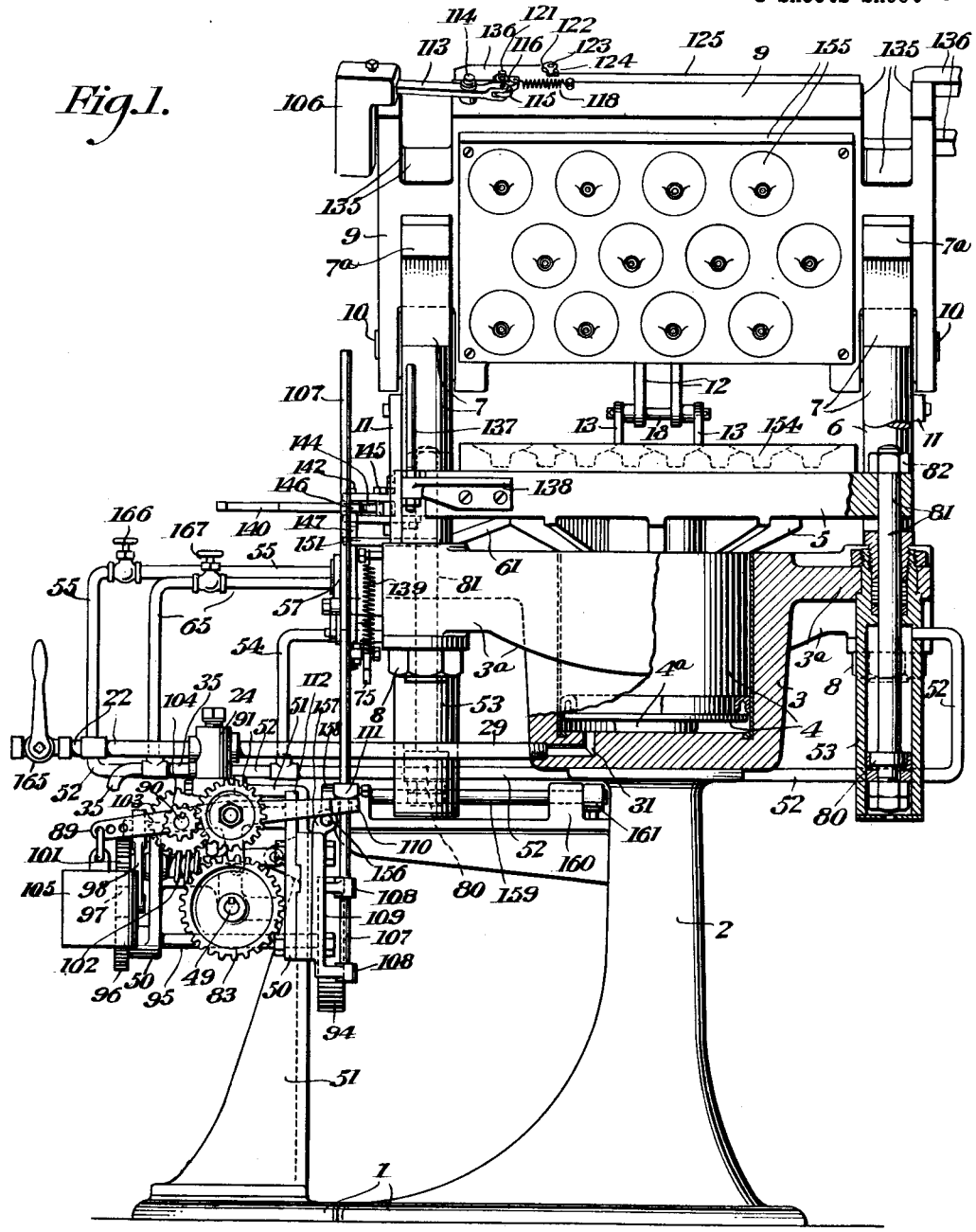

May 10, 1927.

H. D. NITCHIE 1,628,057

MOLDING APPARATUS

Filed June 21, 1926   8 Sheets-Sheet 1

INVENTOR
Hubbard D. Nitchie
BY
ATTORNEYS

May 10, 1927.
H. D. NITCHIE
1,628,057
MOLDING APPARATUS
Filed June 21, 1926      8 Sheets-Sheet 3
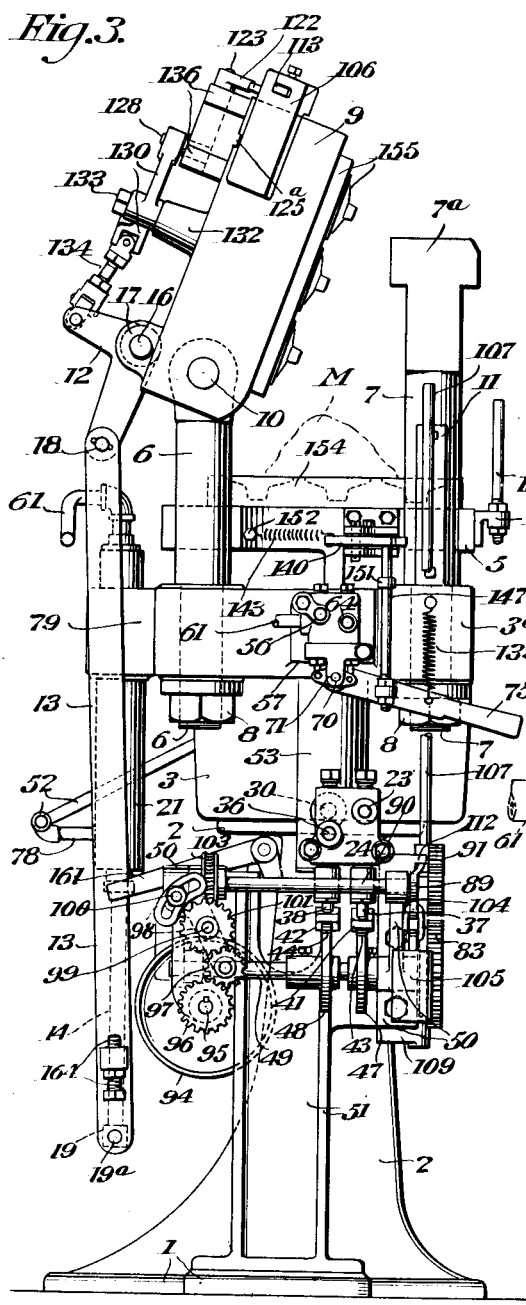
Fig. 3.
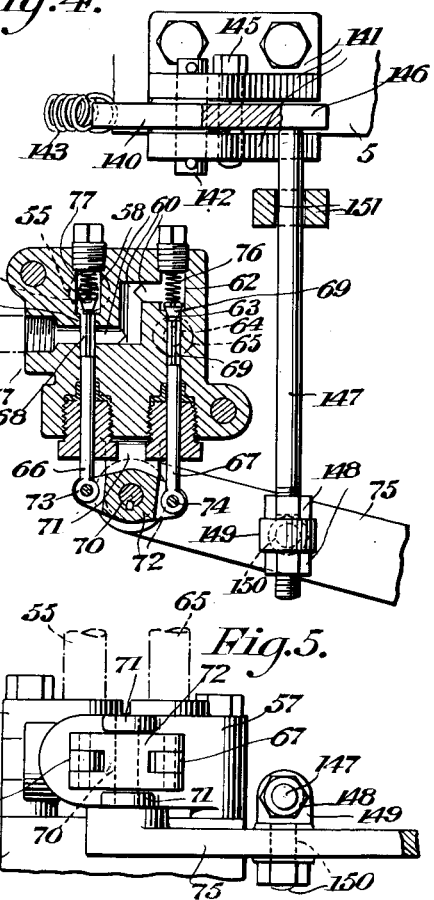
Fig. 4.
Fig. 5.
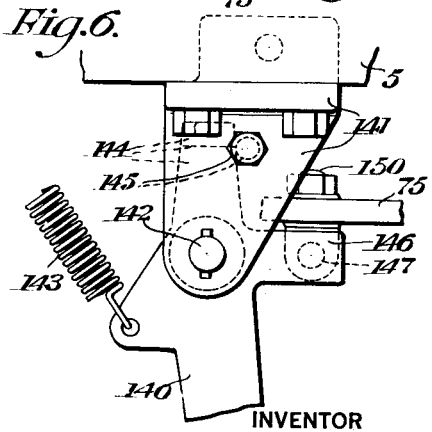
Fig. 6.
INVENTOR
*Hubbard D. Nitchie*
BY
ATTORNEYS

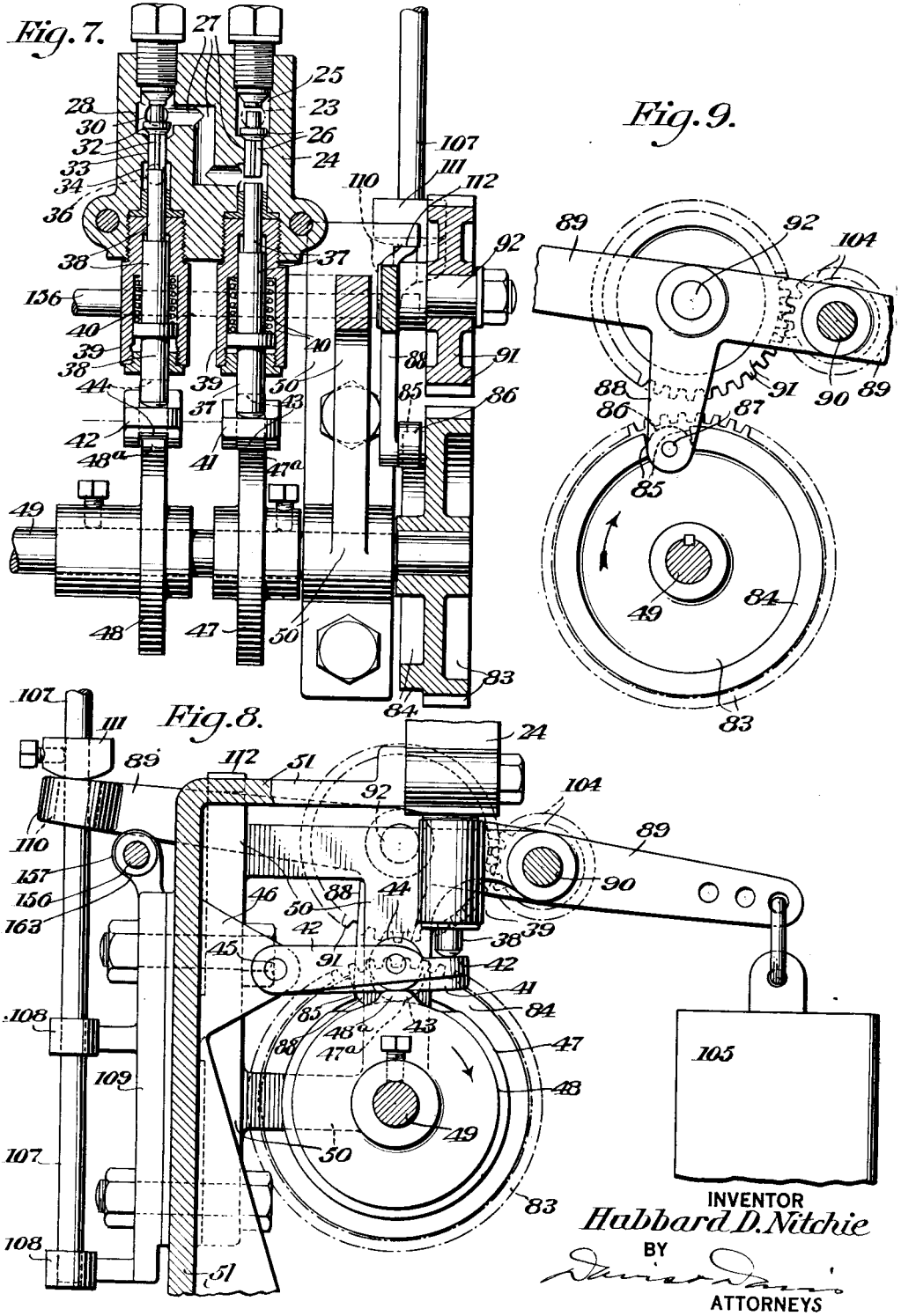

May 10, 1927.

H. D. NITCHIE

MOLDING APPARATUS

Filed June 21, 1926

1,628,057

8 Sheets-Sheet 5

INVENTOR
Hubbard D. Nitchie
BY
ATTORNEYS

May 10, 1927.

H. D. NITCHIE

MOLDING APPARATUS

Filed June 21, 1926  8 Sheets-Sheet 6

INVENTOR
Hubbard D. Nitchie
BY
ATTORNEYS

May 10, 1927.  
H. D. NITCHIE  
1,628,057  
MOLDING APPARATUS  
Filed June 21, 1926   8 Sheets-Sheet 7

INVENTOR  
Hubbard D. Nitchie  
BY  
ATTORNEYS

May 10, 1927. 1,628,057
H. D. NITCHIE
MOLDING APPARATUS
Filed June 21, 1926 8 Sheets-Sheet 8
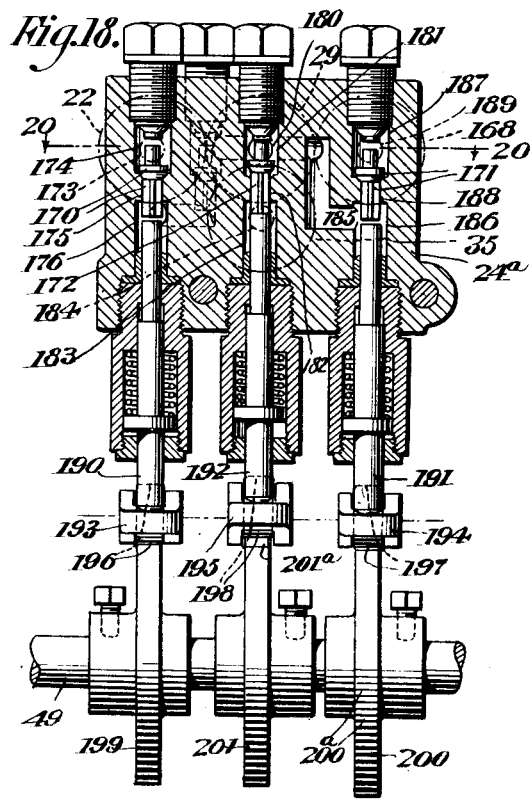
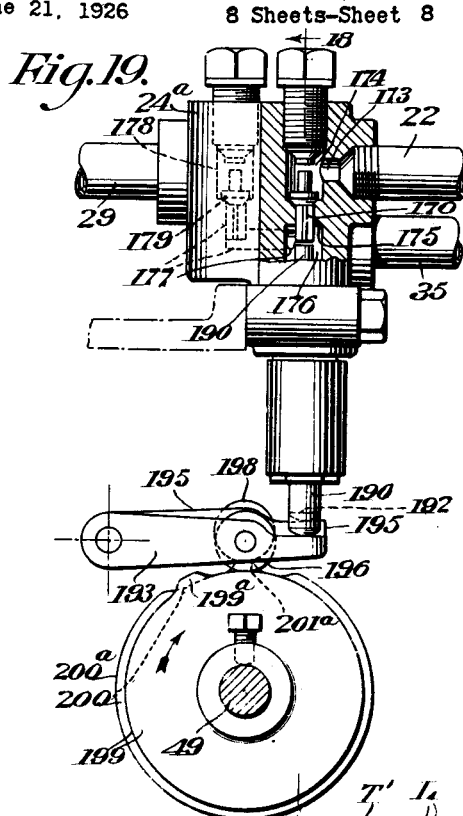
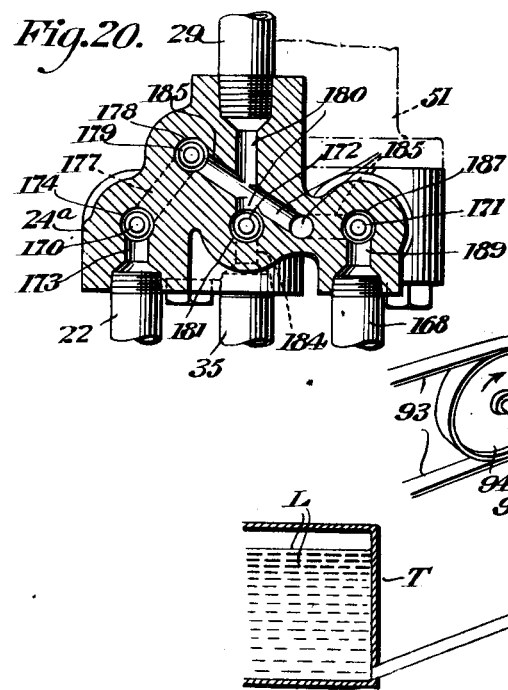
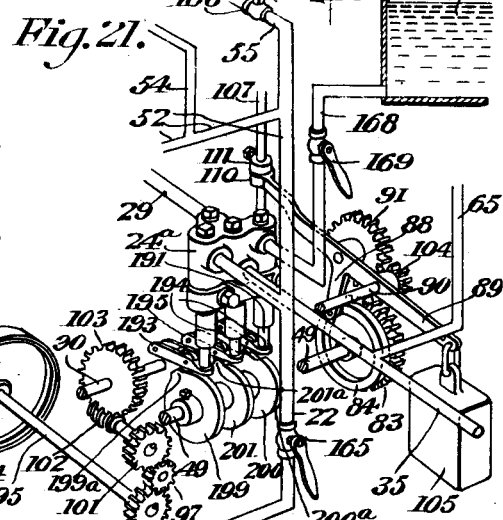
INVENTOR
Hubbard D. Nitchie
BY
ATTORNEYS Patented May 10, 1927.

1,628,057

UNITED STATES PATENT OFFICE.

HUBBARD D. NITCHIE, OF CRANFORD, NEW JERSEY, ASSIGNOR TO THE WATSON-STILLMAN CO., OF NEW YORK, N. Y., A CORPORATION OF NEW JERSEY.

MOLDING APPARATUS.

Application filed June 21, 1926. Serial No. 117,379.

This invention relates to improvements in molding apparatus, and more particularly to apparatus for use in manufacturing articles by molding or shaping the same from moldable material such, for example, as permanently or temporarily plastic material, or material capable of being rendered temporarily plastic by heating or otherwise. The apparatus is particularly adapted for use in the manufacture of control dials for radio apparatus, electric and heat insulating knobs and handles, phonograph sound record disks, celluloid and artificial ivory articles, rubber and artificial rubber articles, and bases for electric lamps and vacuum tubes, for example, from masses of moldable material, but it is also well adapted for use in molding or shaping sheet material into a desired form.

The principal objects of the invention are to provide an efficient fluid-pressure-operated molding apparatus; to provide a fluid-pressure operated molding apparatus adapted when put into action to automatically perform a single complete molding operation; to provide a power-operated molding apparatus designed to perform rapid and efficient work with a maximum of convenience and safety for the operative; to provide a molding apparatus so constructed that an unskilled operative may produce articles of uniformly good quality; to provide a molding apparatus operating automatically to produce at successive operations articles from material subjected to pressure of the same degree for the same duration of time; to provide a molding press wherein the dies or mold members may be readily attached to and removed from the press heads and may be readily inspected and cleaned, and wherein the material to be molded may be conveniently placed in position and the molded article readily removed; to provide a molding apparatus having a pivoted press head and a reciprocable press head, and means for locking the pivoted head in parallelism with the reciprocable head adapted, when moved to locking position, to put into action means for moving the reciprocable head toward the pivoted head; and to provide a power operated molding press having a reciprocable head and a pivoted head movable into and out of parallelism with the reciprocable head wherein, upon movement of the pivoted head into parallelism with the reciprocable head, means are put into action for moving the reciprocable head toward and from the pivoted head, and retraction of the reciprocable head causes the operating means for the pivoted head to swing the latter head out of parallelism with the reciprocable head.

To the above and other ends, which will appear from the following description in detail of the embodiment of my invention, shown in the accompanying drawings, the invention comprises the features of construction, combinations of devices, and arrangements of parts pointed out in the claims.

Figure 2:
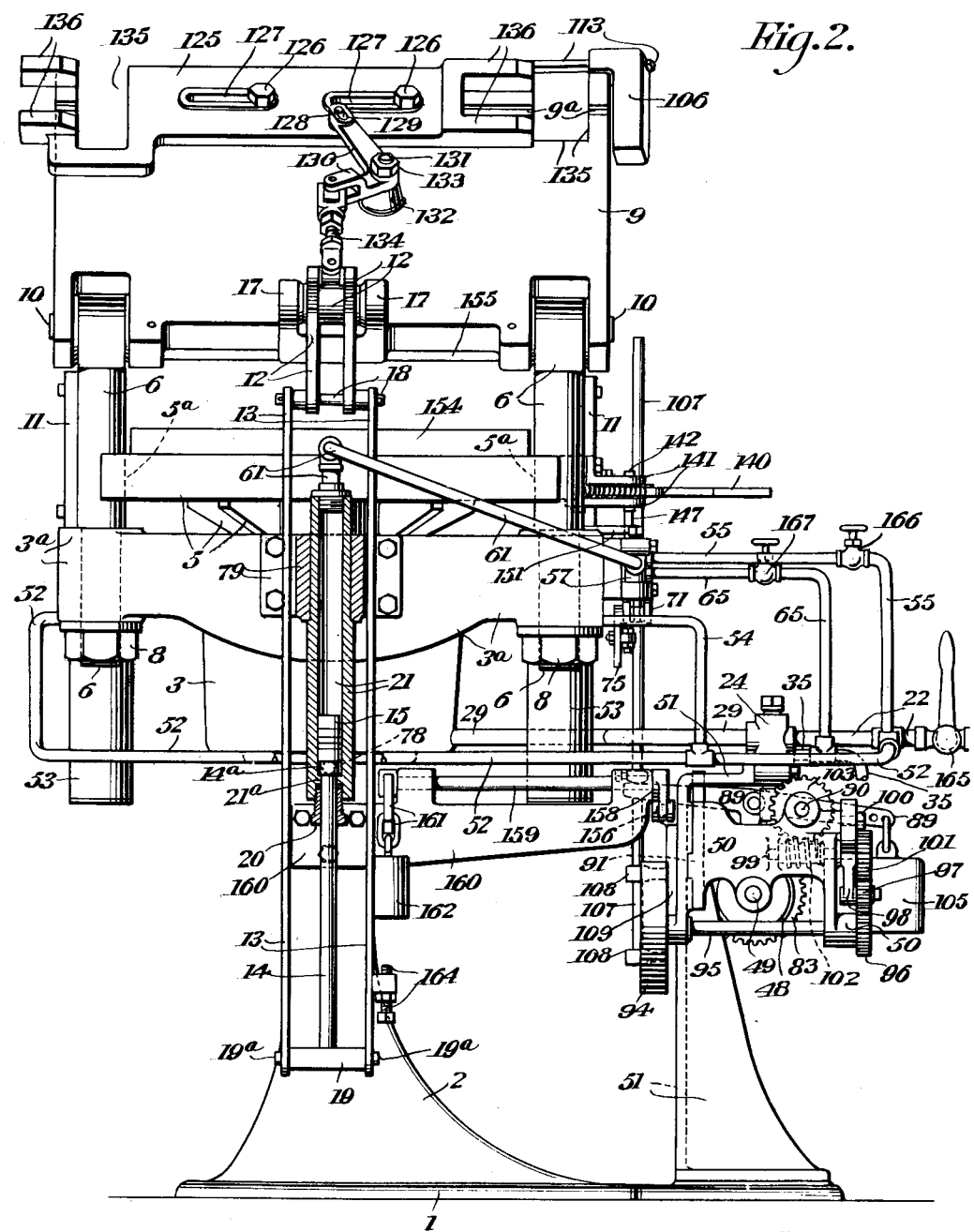
Figure 10:
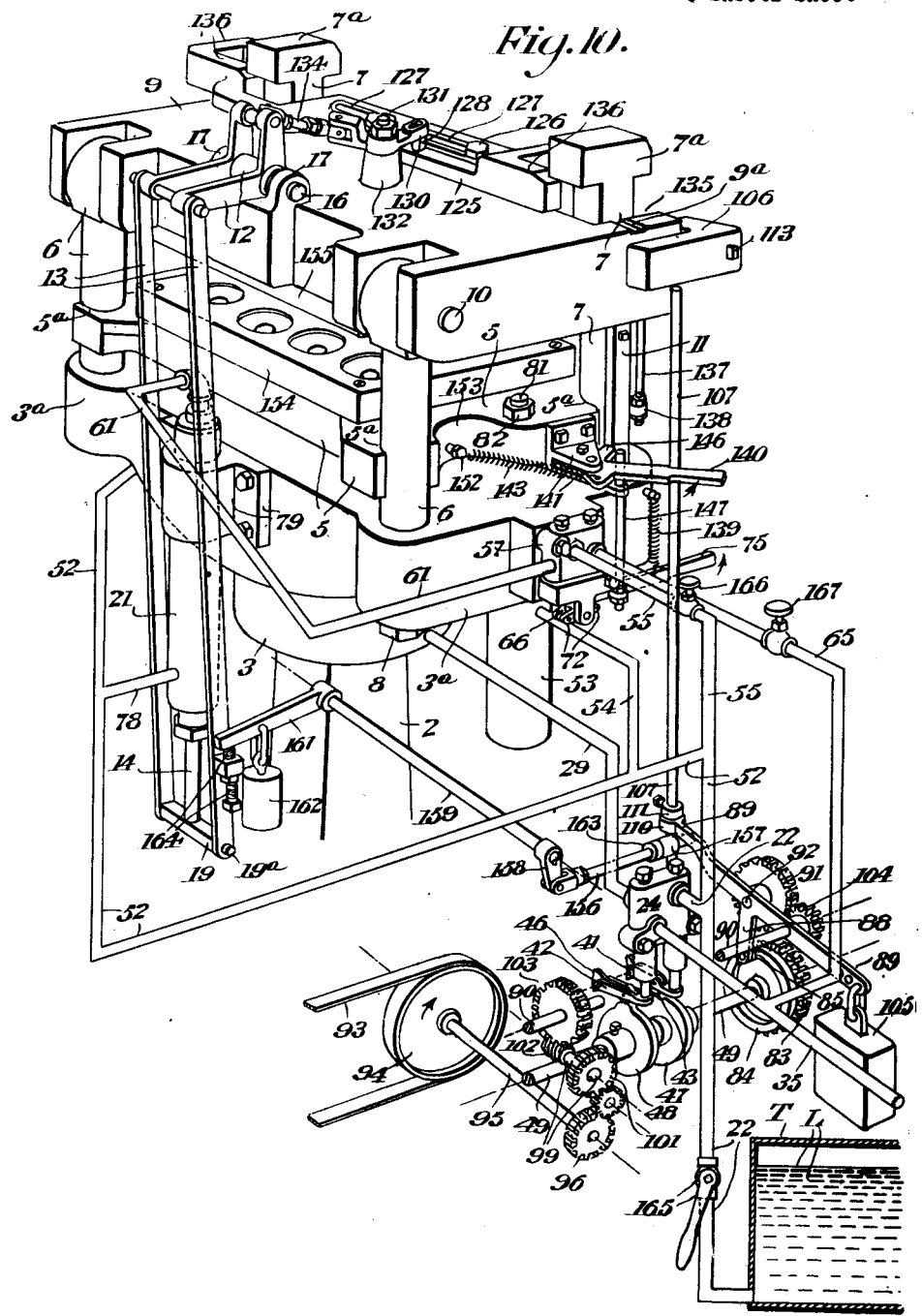
Figure 11:
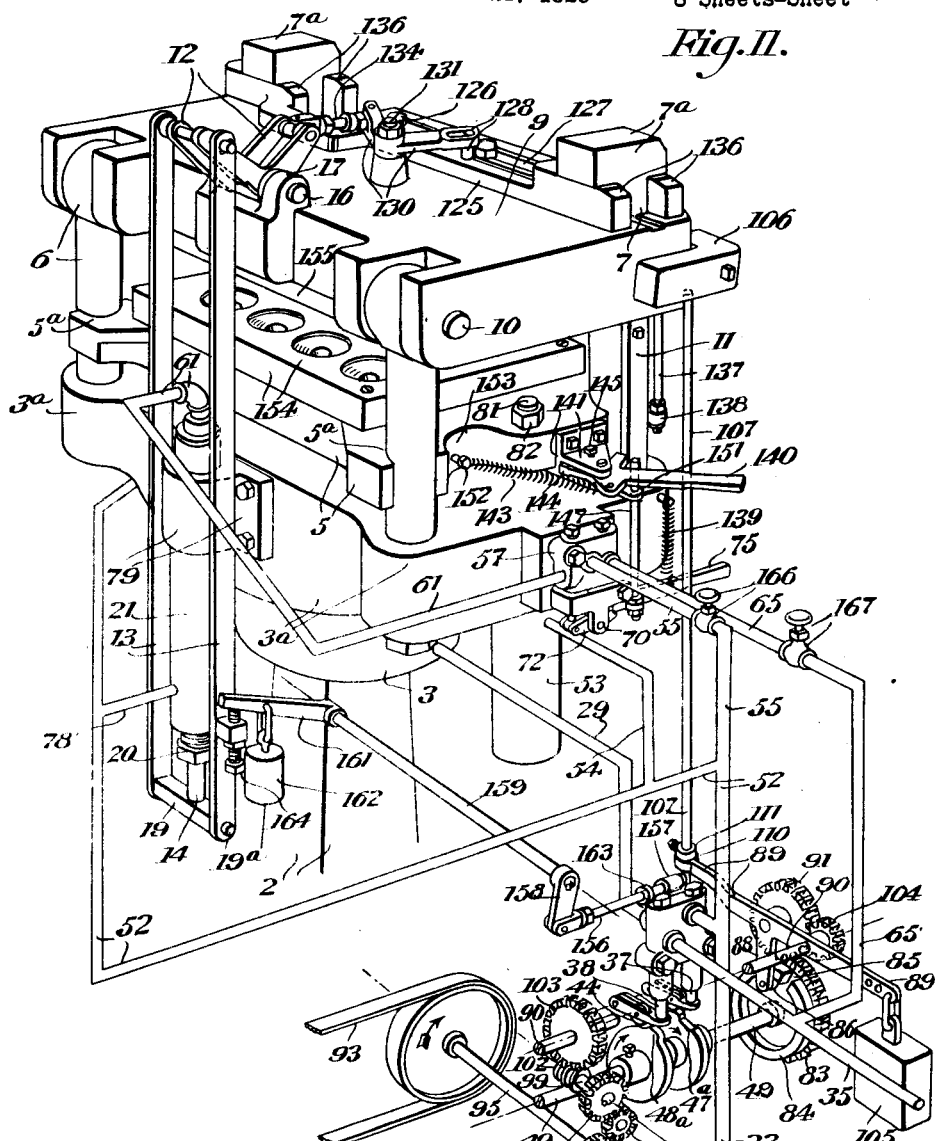
Figure 12:
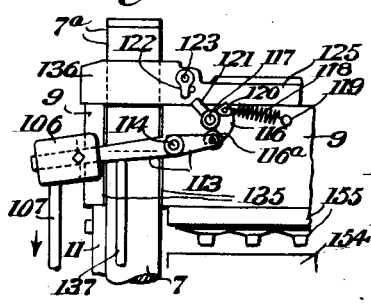
Figure 13:
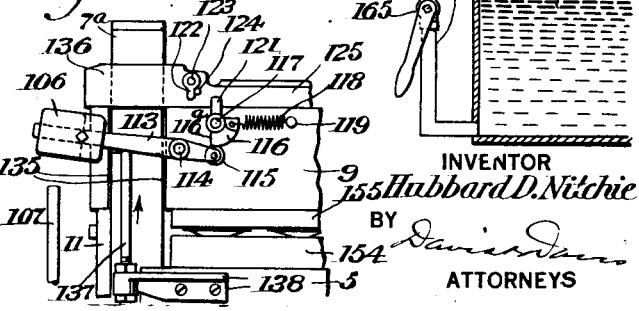
Figure 14:
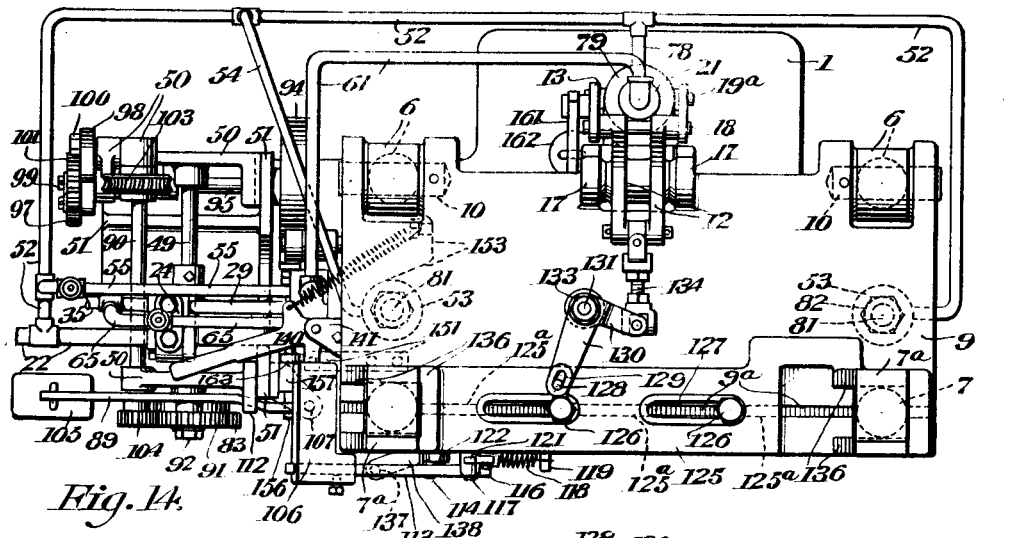
Figure 15:
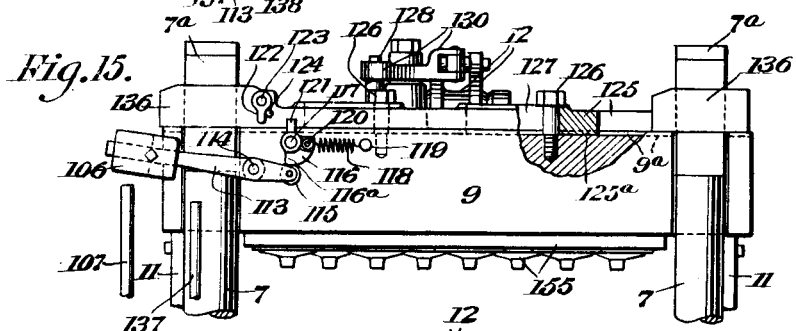
Figure 16:
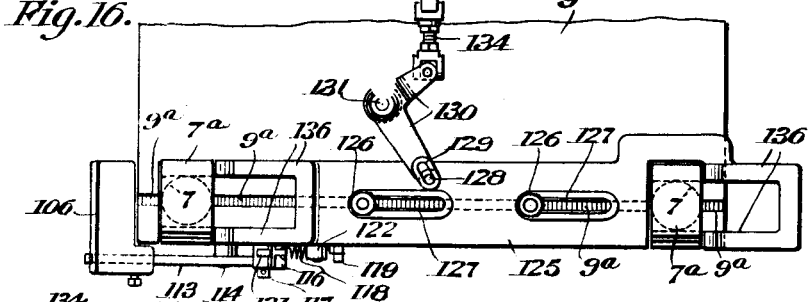
Figure 17:
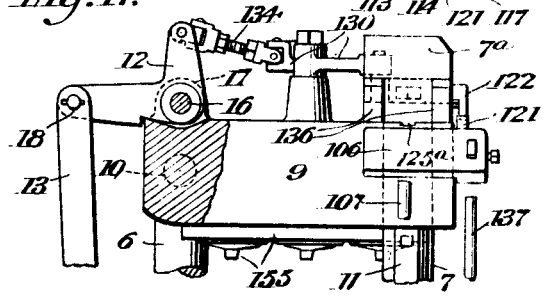

In the drawings:

Figure 1 is a front elevation of the apparatus with the parts in normal idle position;

Fig. 2 a rear elevation;

Fig. 3 a side elevation;

Fig. 4 a detail vertical section of the control valve for the power means for actuating the pivoted head and its locking device, the parts being in normal position;

Fig. 5 a bottom plan view of the parts shown in Fig. 4;

Fig. 6 a top plan view of the operating means for the valve device shown in Figs. 4 and 5;

Fig. 7 a vertical sectional view of the valve device and the operating means therefor which controls the operation of the reciprocable head, the parts being in normal position;

Fig. 8 a rear elevation of the parts shown in Fig. 7;

Fig. 9 a detail view of part of the operating mechanism for the control valve shown in Figs. 7 and 8, the parts being in normal position;

Fig. 10 a perspective view of the apparatus showing the positions of the parts at the end of the downward movement of the pivoted head and the beginning of the locking movement of the latch bar, the piping arrangement being shown somewhat diagrammatically;

Fig. 11 a view similar to Fig. 10 showing the position of the parts as fluid begins to flow to the ram cylinder to lift the lower head;

Fig. 12 a detail front elevation showing the devices for putting into action the operating means for the lower head control valve operated as the latch bar moves into latching position;

Fig. 13 a view similar to Fig. 12 showing the resetting of the weighted lever shortly before the end of the upstroke of the lower head;

Fig. 14 a plan view of the apparatus showing the positions of the parts at the end of the down-stroke of the lower head;

Fig. 15 a detail front view showing the parts positioned as in Fig. 14;

Fig. 16 a detail plan view showing the pivoted head unlocked and its operating means positioned to start upward swinging of the head;

Fig. 17 a detail side elevation showing the parts positioned as in Fig. 16, preparatory to return of the pivoted head to normal position;

Fig. 18 a view similar to Fig. 7 showing a modified form of control valve device for the reciprocable head, the parts being in normal position;

Fig. 19 an end elevation, partly broken away, of the parts shown in Fig. 18;

Fig. 20 a section on the line 20—20 of Fig. 18; and

Fig. 21 a perspective view showing the modified control valve device and its operating means, and the piping connections therewith, the parts being in normal or pressure release position.

The base 1 of the apparatus is adapted to be secured to a floor or other suitable foundation. A standard 2 rises from the base 1 and has rigidly secured on the upper end thereof a vertical ram cylinder 3 having an open upper end. A large piston or ram 4 is mounted in the cylinder 3 and has a reduced lower end portion 4ª normally seated against the bottom of the cylinder, as shown in Fig. 1. The lower head 5 of the press is rigidly held to the upper end of the ram 4 to reciprocate vertically with the ram. The cylinder 3 is formed around its upper end with an outwardly extending rim 3ª of generally oblong form in plan view. A pair of vertical posts 6 rise from the two rear corners of the rim 3ª and a second pair of vertical posts 7 rise from the two front corners of said rim. Posts 6 and 7 have reduced lower end portions extending down through apertures in the four corners of said rim and are rigidly held to the rim by nuts 8 threaded on said reduced lower end portions. The reciprocable press head 5 is of general oblong form in plan view and is provided with segmental notches 5ª in its end edges through which the four upright posts extend to assist in guiding the head to move perpendicularly.

The upper head 9 of the press is pivotally held adjacent its rear edge to the upper ends of the posts 6 by means of horizontal pivot pins 10. Downward swinging movement of press head 9 is limited by means of a pair of stop bars 11 rigidly secured against the outer sides of posts 7. The flat under face of head 9 is adapted to engage the upper ends of the stop bars 11 when said face is parallel with the horizontal upper face of the press head 5.

The head 9 is normally held rocked upwardly and rearwardly at an angle of slightly less than 90 degress to the horizontal, as shown in Figs. 1, 2 and 3, by means of a train of head-swinging mechanism comprising a bell-crank lever 12, a pair of parallel upright links 13, a vertically reciprocable piston rod 14, and a piston 15. The bell-crank 12 is pivotally mounted on a horizontally disposed pivot pin 16 extending transversely of the press through a pair of ears 17 which rise from the upper face of press head 9 adjacent the rear edge of said head. The upper ends of the links 13 are connected to the rear arm of bell-crank 12 by means of a pivot pin 18 and the lower ends of said links are pivoted on the reduced cylindrical end portions 19ª of a horizontal cross-head 19 which is rigidly secured midway its ends to the lower end of the piston rod 14. The piston rod 14 slidingly extends through a suitable stuffing box 20 in the lower end of a vertical cylinder 21 in which piston 15 reciprocates. The piston rod 14 is formed with a circumferential shoulder 14ª immediately below the piston 15 which shoulder normally engages an annular stop shoulder 21ª formed in the cylinder 21.

Press head 5 is reciprocated, and press head 9 is swung about its pivot, by fluid pressure in the particular embodiment of the invention illustrated, the press heads being actuated by liquid supplied under pressure through a main supply pipe 22. A supply of liquid at a substantially constant pressure is maintained to the pipe 22 by any suitable means, as by connecting said pipe with a hydraulic pressure accumulator tank T, in which a supply of liquid L is maintained at a substantially constant level under a substantially constant pressure by suitable known means, not shown.

The pipe 22 leads from the tank T to an inlet port 23 communicating with a pressure supply valve chamber 25 in the casing 24 of a valve device which controls the supply of pressure fluid to and exhaust thereof from the ram cylinder 3. The pressure supply valve 26 is an ordinary poppet valve normally held to its seat by pressure in the valve chamber 25 to close a passage 27 leading from chamber 25 to the pressure exhaust valve chamber 28 in the valve casing. A pipe 29 connects a port 30 communicating with valve chamber 28 with a port 31 extending through the bottom wall of the ram cylinder 3. The pressure exhaust valve 32 is normally held off its seat, as shown in Fig. 7, to open communication between the valve chamber 28 and a fluid exhaust chamber 34 through a passage 33. A waste pipe 35 is connected with an outlet port 36 in the valve casing 24 communicating with the fluid exhaust chamber 34.

The valves 26 and 32 are adapted to be unseated alternately by means of vertically reciprocable plungers 37 and 38, respectively, guided in suitable housings 39 depending from the valve casing 24, said plungers being normally urged downwardly by coil springs 40 against the upper faces of pivoted tappets 41 and 42, respectively. Tappets 41 and 42 carry contact rollers 43 and 44, respectively, which engage the peripheries of cam discs 47 and 48. The cam discs 47 and 48 are fixed on a shaft 49 which is journalled in suitable bearings in a pair of brackets 50 fixed to a standard 51 rising from the base 1. The valve casing 24 is rigidly secured to the standard 51, and the tappets 41 and 42 are pivoted on horizontal pivot pins 45 held in webs 46 on the standard 51, said tappets having forked pivot ends embracing said webs. The cams 47 and 48 normally occupy the position shown in Figs. 7 and 8 in which the roller 44 rests on a high point 48ª of cam 48 to hold up tappet 42, plunger 38, and pressure fluid exhaust valve 32, and the roller 43 rests on the low point 47ª of cam 47 so as to permit the pressure fluid supply valve 26 to rest on its seat. It will be observed that, in the normal position of the parts, ram cylinder 3 is in open communication with waste pipe 35 so that ram 4 normally rests on the bottom of the ram cylinder, as shown in Fig. 1.

A pipe 52 leads from the main supply pipe 22, at a point between the tank T and the control valve device 24, to the upper end of the right hand one of two small vertical pull-back cylinders 53 which are rigidly held to and depend from the rim 3ª of the ram cylinder 3 on opposite sides of the press. A branch pipe 54 connects pipe 52 with the upper end of the left hand one of the pullback cylinders 53, and a branch pipe 55 connects the pipe 52 with an inlet port 56 in the casing 57 of a control valve device for the press head-swinging means. The port 56 communicates with a pressure fluid supply valve chamber 58 in the casing 57. A passage 59 leads from the bottom of chamber 58 to a passage 60 in the valve casing, which latter passage is connected at one end with a pipe 61 and its other end with a pressure fluid exhaust valve chamber 62 in the valve casing. The pipe 61 connects passage 60 with the upper end of the cylinder 21. The exhaust valve chamber 62 is connected by a passage 63 to an exhaust port 64 to which is connected one end of a branch waste pipe 65, the other end of which is connected with the waste pipe 35.

The vertical passages 59 and 63 extend across the passages 60 and 64, as shown in Fig. 4, and rods or plungers 66 and 67 extend up into the lower end of said passages 59 and 63 through suitable stuffing boxes and engage the lower ends of poppet valves 68 and 69, respectively. A rock shaft 70 extends horizontally between the lower ends of the valve-lifting rods 66 and 67 and is journalled in ears 71 depending from the valve casing 57. A rocker 72 is keyed on shaft 70. The valve-lifting rods 66 and 67 are connected by pivot pins 73 and 74, respectively, at their lower ends with said rocker 72 on opposite sides of the rock shaft 70, so that when one rod is drawn downwardly the other rod is forced upwardly.

The rock shaft 70 is adapted to be oscillated by means of a hand lever 75 fixed on one end of the rock shaft and normally occupying the position shown in Figs. 1 to 6, inclusive, in which the exhaust valve 69 is held to its seat by fluid pressure in chamber 62 and the pressure of a coil spring 76, and the pressure supply valve 68 is held unseated against the pressure in the chamber 58 and the pressure of a light coil spring 77, as shown in Fig. 4, so that the upper end of cylinder 21 is normally maintained in open communication with the source of fluid pressure T. The lower end of cylinder 21 is maintained at all times in open communication with the source of pressure T by means of a branch pipe 78 leading from pipe 52 to the lower end of cylinder 21 at a point opposite the shoulder 14ª on the piston rod 14, which shoulder is of slightly less diameter than the bore of the cylinder 21. As the pressure area at the lower end of piston 15 is smaller than the pressure area at the upper end of said piston, it will be obvious that, when the lever 75 is in normal position, shown in Figs. 1 to 6, the pivoted press head 9 will be held rocked upward in the position shown in Figs. 1, 2 and 3, since bell-crank 12 will be held in the position shown in Figs. 1, 2 and 3 by the preponderating downward pressure on piston 15 with the lower edge of the rear arm of said bell-crank engaging the upper face of head 9 at the rear of the pivot 16 of the bell crank so that head 9 cannot drop downwardly about its pivots 10.

The cylinder 21 is rigidly held in a suitable bracket 79 secured to the rear edge of the ram cylinder rim 3ª, and the control valve device casing 57 is rigidly held to the left hand edge of said cylinder rim. The two pull-back cylinders 53, above referred to, are open to the atmosphere at their lower ends, and small pull-back pistons 80 in said cylinders are constantly urged downwardly by the pressure of fluid from the tank T in the upper portions of said cylinders. The pistons 80 are carried by piston rods 81 the upper ends of which pass upwardly through suitable apertures in the end portions of the reciprocable press head 5 and have nuts 82 threaded thereon.

The actuating cams 47 and 48 for the control valve device 24 are adapted to be driven through a single revolution during each molding operation of the press through a driven timing device. This timing device comprises a gear wheel 83 fixed on the shaft 49 and having on its rear face a locking flange 84 concentric with shaft 49 and extending continuously around the shaft except for a single, relatively narrow, radial notch or slot 85. A locking roller 86, journalled at 87 on the lower end of an arm 88 depending from the right hand arm of a gear-shifting lever 89, is normally engaged in said notch 85. The gear-shifting lever 89 is loosely pivoted on a shaft 90 which is journalled in the brackets 50, and the right hand arm of said lever has journalled thereon, at 92, the shiftable driving gear wheel 91 of a constantly running train of driving mechanism.

The constantly-running driving gear 91, as shown in Figs. 1, 2, 3, 7, 8 and 9, is normally disconnected from the driven timing device 83—84. The constantly-running driving mechanism is driven from a suitable motor by means of a belt 93. A pulley 94 driven by said belt is fixed on a shaft 95, and a pinion 96 fixed on shaft 95 meshes with a pinion 97 journalled on a hanger 98 pivoted on a shaft 99. Shaft 99 is journalled in the rear one of the brackets 50. The hanger 98 is adapted to be adjustably clamped to the upper end of the rear one of the brackets 50 by means of a clamping nut 100. The pinion 97 meshes with a pinion 101 fixed on the shaft 99, and a worm 102 fixed on the shaft 99 meshes with a worm gear 103 fixed on the shaft 90. A pinion 104 fixed on shaft 90 meshes with the shiftable driving gear 91. It will be observed that the train of driving mechanism constitutes a well known form of speed reduction gearing whereby the timing device 83—84 may be driven at low speed from an ordinary motor, and it will also be observed that the adjustable hanger 98 constitutes a well known form of support whereby pinion 97 may be adjusted to permit the employment of pinions 96 of various sizes to vary the R. P. M. of the shiftable driving gear 91 as desired.

The gear shifting lever 89 is adapted to be rocked in opposite directions by power devices, comprising weights 105 and 106, to respectively disconnect and connect the constantly-running driving mechanism and the driven timing device 83—84. The weight 105 constantly tends to rock the lever 89 in a direction to disconnect the gear 91 from the gear 83 and normally maintains said gears disconnected, as shown in Figs. 1, 2, 3, 7, 8 and 9. The weight 106 is adapted to rock lever 89 in the opposite direction to cause gear 91 to mesh with gear 83, as shown in Fig. 11 and more fully hereinafter described, through the medium of an actuating rod or plunger 107 for the gear-shifting lever, vertically slidable in bearings 108 on a bracket 109 which is held to the standard 51. The right hand end of the lever 89 is formed with an eye 110 through which rod 107 loosely extends, and the rod 107 has a collar 111 rigidly held thereto and engaging the upper face of the eye 110. The upward swinging movement of the eye-carrying end of lever 89 is limited by engagement of said lever end under a stop 112 comprising a projection or lug extending forward from the upper end of the forward bracket 50.

The weight 106 is secured to the left hand arm of a lever 113 fulcrumed on a stud 114 projecting forwardly from the forward edge of the pivoted press head 9. The right hand arm of the lever 113 carries a contact roller 115 normally engaged under the arcuate lower edge of a segmental cam 116 at a point directly under the pivot stud 117 upon which said cam is rockably supported. The pivot stud 117 projects forwardly from the forward edge of press head 9, and the cam 116 is normally yieldably held in the position shown in Figs. 1, 13 and 15, by means of a spring 118. Spring 118 is connected at one end to a pin 119, projecting from the forward edge of the press head 9, and is connected at its other end at 120 to the right hand edge portion of the cam at a point normally in a horizontal plane through the pins 117 and 119. The cam 116 is provided with an arm 121 normally extending directly upward from the pivot of the cam in the path of the depending arm of a pivoted trip device 122. The right hand edge of the trip device 122 normally abuts against a stop pin 124 to prevent said device from swinging toward the right about its pivot 123. The pivot pin 123 and the stop pin 124 project forwardly from the forward edge of a horizontally slidable latch-bar 125, slidably guided on the upper face of the pivoted press head 9 by means of guiding rib portions 125ª on the latch bar working in a groove 9ª in the press head, said latch bar being held to the head by retaining bolts 126 extending through slots 127 formed in the latch bar 125, and extending longitudinally of said bar.

The latch bar 125 is operated by the manually-controlled power-operated means heretofore described which shifts the pivoted press head 9, and said latch bar is normally held in retracted position at the limit of its sliding movement toward the right hand side of the press as shown in Figs. 1, 2, and 3, by means of a train of operating devices connecting the latch bar with the forward arm of the bell-crank 12. An upright pin 128, rigidly held to and rising from the upper surface of the latch bar, projects through a slot 129 in the forward arm of a bell-crank 130 which is mounted on a stud bolt 131 rising from a central boss 132 on the upper face of the press head 9, the said stud bolt being perpendicular to the plane of the press head. A nut 133 screwed on the upper end of the stud bolt holds the bell-crank 130 on its pivot. The second arm of the bell-crank 130 extends laterally of the press head and is connected with the forward arm of the bell-crank 12 by means of a link 134 having universal joint connections of conventional form at its opposite ends with said arms of the two bell-cranks, as shown.

The latch bar is moved to locking position by pivotal movement of the bell-crank 12 about its axis 16 from the position shown in Fig. 10 to the position shown in Fig. 11, which movement takes place immediately following a movement of the pivoted press head 9 from the position shown in Fig. 3 to the position shown in Fig. 10. When the press head 9 is moved downwardly into horizontal position, with its lower face resting on the upper ends of stop bars 11, the posts 7 project upwardly through slots 135 in the press head 9, which slots extend rearwardly from the forward edge of the press head near opposite ends of the head. The posts 7 are provided with heads 7ª at their upper ends under which the side arms of the forked end portions 136 of the latch bar 125 are adapted to engage, when the pivoted press head is in lowered position, to lock said head against upward swinging movement away from the upper ends of the stop bars 11. When the latch bar is in locking position, the head 9 is rigidly held in parallelism with the reciprocable press head 5 against both up and down movements.

When the latch bar is in release or retracted position, the trip device 122 is located to the right of the trip arm 121 on the locking cam 116, as shown in Figs. 1, 3 and 16, and during movement of the forked ends 136 of the latch bar into locking position under the post heads 7ª, said trip device 122 engages said trip arm 121 and, as it rides over said trip arm, rocks the cam 116 in counter-clockwise direction to release the weighted lever 113 and permit downward movement of the weight 106 which then strikes the upper end of the rod 107 and forces said rod downwardly, as shown in Fig. 12. The downward movement of the rod 107 rocks the gear shifting lever 89 in opposition to the pull of the weight 105 to cause meshing of the gears 91 and 83, for the purpose hereinafter described, the weight 106 being designed to overcome the weight 105. When the weight 106 swings downwardly the roller 115 on lever 113 moves upwardly in front of the radial left hand edge 116ª of the cam 116, as shown in Fig. 12. The lever 113 is adapted to be restored to normal position on the up stroke of the press head 5, as shown in Fig. 13, by means of a vertical rod 137 which is rigidly held at its lower end to a bracket 138 secured to the forward edge of the press head 5.

A coil spring 139 which is connected at its upper end with ram cylinder rim 3ª and at its lower end with the operating hand lever 75 for the control valve device 57, counterbalances the weight of said hand lever. A safety hand lever 140 is held to a bracket 141, secured to the left hand edge of the press head 5, the said lever being movable bodily up and down in unison with the press head 5 and being fulcrumed on a vertical pivot pin 142, carried by bracket 141, to permit horizontal swinging of the lever relatively to the press head 5. A coil spring 143 normally holds the lever 140 in the position shown in Figs. 1 to 6, inclusive, in which an inwardly extending stop arm 144 of said lever is engaged behind a stop bolt 145, carried by and passing through the bracket 141, to arrest rearward swinging of the main horizontal handle arm of the lever with a forwardly extending lug 146 on the lever engaging directly over the upper end of a vertical rod 147. Rod 147 is rigidly held by locking nuts 148 in a carrier 149 swiveled on a horizontal pivot 150 extending through the lever 75. Adjacent its upper end the rod 147 passes loosely through an aperture in a guide bracket 151 secured to the upper face of the ram cylinder rim 3ª. The coil spring 143 for the lever 140 extends rearward and inward from the main handle arm of said lever and is anchored at its rear end to a screw 152 tapped in the inner end of an inwardly extending recess 153 formed in the left hand end edge of the press head 5. The lug 146 on the safety hand lever 140 is adapted to engage the upper end of the rod 147 on the down stroke of the press head 5 to shift the hand lever 75 from an upwardly swung position, shown in Figs. 10 and 11, to its normal downwardly swung position, shown in Figs. 1 to 6, inclusive, and to normally prevent upward swinging of the valve-operating lever 75 until the handle arm of the safety lever 140 is rocked forward, as shown in Figs. 10 and 11, against the pull of the spring 143.

Co-operating mold or die members 154 and 155 are secured by suitable fastening devices respectively to the upper face of the press head 5 and the lower face of the press head 9. It will, of course, be understood that the form of these die members will vary in accordance with the article to be molded. It will also be understood that the press may be equipped with the usual means for heating and cooling the die members, if desired.

Operation.

The operation of the apparatus shown in Figs. 1 to 17, inclusive, the construction of which is described above, will now be explained more fully. When the material to be molded is placed on the lower die or mold member 154, the operative pulls forward the hand lever 140 with one hand and then pulls up the hand lever 75 with the other hand and releases both levers, whereupon the press apparatus automatically goes through a single cycle of operations to form a molded article, or a plurality of articles where the dies are designed to form several articles simultaneously, as is the case with the particular dies shown which are designed to form a plurality of control dials for radio receiving sets from a mass of plastic material "M". The two-hand starting control compels the operative to withdraw both hands from between the press heads before the press can be put into action.

Upon upward movement of lever 75, rod 147 moves up opposite the left hand edge of lug 146 on lever 140, as shown in Fig. 10. Upward movement of lever 75 draws down rod 66 and pushes up rod 67, whereupon valve 68 seats to close communication between accumulator tank T and the upper end of cylinder 21, and valve 69 is unseated to connect the upper end of said cylinder with the waste pipe branch 65, and pressure fluid flows out of said cylinder end to permit the constant fluid pressure on the smaller lower end of piston 15 to force said piston upward. As piston 15 moves upward, links 13 also move upward and the press head 9 (which is slightly inclined toward the front) and bell-crank 12 then swing bodily as a unit about the pivotal axis 10 of the press head until the head comes to rest in a horizontal plane with its bottom face seated on the upper ends of stop bars 11. Continued upward movement of piston 15 and links 13 then rocks bell-crank 12 about its pivot 16, from the position shown in Fig. 10 to that shown in Fig. 11, to cause the connections between said bell-crank and the latch bar 125 to move the latch bar endwise toward the left into locking position, (Figs. 11 and 12).

As the forked ends 136 of the latch bar slide under the heads 7ᵃ of posts 7, trip 122 rocks cam 116 to release position, whereupon weight 106 drops down on and depresses rod 107, as shown in Figs. 11 and 12, thereby rocking lever 89 in opposition to weight 105 to carry the constantly running driving gear 91 into mesh with the driven timing gear 83 and simultaneously move locking roller 86 on lever 89 down out of notch 85 in locking flange 84 on gear 83. Gear 83 will immediately start to rotate so as to drive cams 47 and 48. This gear will make a single revolution, the roller 86 engaging under flange 84 during such rotation to lock gears 83 and 91 in mesh. As the cams 47 and 48 begin to rotate the roller 44 on tappet 42 first drops off the short high point 48ᵃ of cam 48 onto the long low peripheral portion of said cam, and valve 32 immediately seats to close communication between the ram cylinder 3 and waste pipe 35. Immediately after roller 44 drops, one end of the long high-point of cam 47 engages and forces up roller 43 on tappet 41, whereupon valve 26 is unseated to connect the ram cylinder with pressure supply pipe 22, and the piston or ram 4 is then forced upward to force press head 5 upward toward the lowered and locked press head 9 and thereby mold the material into the form determined by the structure of the dies or mold members between which it is squeezed. The supply of pressure fluid to ram cylinder 3 is maintained through the greater part of the revolution of gear 83 and cams 47 and 48, and the duration of the molding or squeezing action is determined by the speed at which gear 83 is driven. As hereinbefore described, the R. P. M. of gear 83 may be readily varied as desired.

As the press head 5 moves upward the rod 137 carried thereby engages under and rocks the weighted arm of lever 113 upward to permit cam 116 to be snapped into locking position above roller 115 by spring 118 shortly before head 5 completes its upward stroke, as shown in Fig. 13, in which view it will be observed that the dies are not yet in full engagement.

Just before cams 47 and 48 complete their single revolution, roller 43 first drops onto the relatively long low-point 47ᵃ of cam 47 (which extends well beyond both ends of the short high-point 48ᵃ of cam 48) to permit valve 26 to seat and cut off ram cylinder 3 from supply pipe 22, and, immediately after roller 43 drops, the high-point 48ᵃ of cam 48 rides under and lifts roller 44 to unseat valve 32 as the cams and gear 83 complete the single revolution. At this instant notch 85 in locking flange 84 on gear 83 comes again into register with roller 86 on arm 88 of lever 89, whereupon said roller snaps up into said notch, as the lever 89 rocks back to normal position under the pull of weight 105 to demesh gears 91 and 83, and the cams are arrested in their original position. Upon the seating of valve 26 and unseating of valve 32, pressure fluid flows out of ram cylinder 3 to waste pipe 35, and press head 5 immediately descends due to the action of gravity and to the constant downward pressure on the small pull-back pistons 80. It will be understood that the pistons 80 are of small area and are readily forced up by pressure on the large ram 4 during the squeezing operation.

As press head 5 approaches its normal lowered position, the lug 146 on the safety hand lever 140 (which was restored to its normal position by spring 143 during the upstroke of head 5) comes down on top of and depresses rod 147 to automatically restore the valve-operating hand-lever 75 from its upwardly swung position (Figs. 10 and 11) to its normal position, as shown in Fig. 14. The weight of lever 75, as before described, is counterbalanced by spring 139 so that said lever, when manually swung upward and released, will remain rocked up until it is forced down by lug 146, the friction of rods 66 and 67 in the stuffing boxes through which they pass and the fluid pressure on top of valve 68 serving to assist the counterbalancing spring to hold lever 75 in raised position. The tension of spring 139 is not sufficient to rock lever 75 upward, said spring simply counterbalancing the weight of the lever.

Restoration of lever 75 to normal position causes the seating of valve 69 to close the exhaust from the upper end of cylinder 21 and also causes unseating of valve 68 to connect the upper end of said cylinder with the pressure supply pipe branch 55, whereupon pressure fluid flows into the top of cylinder 21 and forces piston 15 downward until collar 14$^a$ on piston rod 14 engages the stop shoulder 21$^a$ in cylinder 21. Downward movement of piston 15 first rocks bell-crank 12 about its pivot 16 independently of head 9, from the position shown in Figs. 11 and 15 to the position shown in Fig. 17, to thereby move latch bar 125 toward the right from the position shown in Figs. 14 and 15 to unlocked position, as shown in Figs. 16 and 17. As latch bar 125 moves to release position, trip 122 rides back idly over arm 121 of cam 116 without actuating the cam. As the latch bar reaches its release position the lower edge of the rear arm of bell crank 12 strikes the top of head 9 at the rear edge of the head, as shown in Fig. 17, so that during the latter portion of the downward movement of piston 15 the press head 9 will be rocked upward and rearward until nearly perpendicular, as shown in Figs. 1 to 3.

The upwardly swung, forwardly facing normal position of head 9 facilitates access to the dies for placing material to be molded in position, for cleaning the dies, for inspection of the dies while in place in the press, and for removal of molded articles. The jaw action of heads 5 and 9 during movement of head 9 into parallelism with the head 5 is also advantageous, when working with large masses of plastic material, in spreading or distributing a mass or masses of plastic material over the lower die and preliminarily compressing such material prior to the main squeezing action of the heads which, in such cases, takes place after the head 9 is locked down and during the up stroke of head 5.

In order to prevent accidental throwing into mesh the gears 91 and 83 when the pivoted press head 9 is unlocked, I prefer to employ an automatic latching means for the gear shifting lever 89. The automatic latching mechanism comprises a latch bolt 156 which is slidably guided adjacent its front end in a sleeve 157 formed on the bracket 109 and is pivotally connected at its rear end to a depending rock arm 158 fixed on a horizontal rock shaft 159 which extends transversely of the press and is journalled in a bracket 160 fixed on the standard 2. A rock arm 161, fixed on shaft 159, extends rearwardly from the shaft past the left hand link 13 of the head-swinging mechanism, and a weight 162 attached to said rock arm normally tends to rock the arm to the position shown in Figs. 2, 3, and 10, in which position of the arm the latch bolt 156 is projected forwardly directly under the lower edge of lever 89 adjacent the eye 110 on said lever, so as to prevent downward swinging of the right hand arm of the lever 89. A stop collar 163 fixed on the latch bolt 156 abuts against the rear end of the guide sleeve 157 to limit the downward swinging movement of the weighted rock arm 161.

When the press head 9 is swung downwardly during a molding operation, a screw 164 carried by the left-hand head-swinging link 13 moves upward into engagement with the lower edge of rock arm 161 as the head 9 comes to rest on the upper end of the stop bars 11, as shown in Fig. 10. As the link 13 continues to rise to move the head-locking latch bar 125 into locking position, as above described, the screw 164 will rock the arm 161 upwardly from the position shown in Fig. 10 to the position shown in Fig. 11, thereby drawing the latch bolt 156 rearwardly from beneath the lever arm 89 as the head-locking bar 125 moves to locking position. It will thus be observed that the latch bolt 156 is automatically retracted an instant before the weight 106 is released for the purpose of carrying gear 91 into mesh with the gear 83 in the manner hereinbefore described. As hereinbefore described, the lever 89 is rocked by the weight 105 to demesh gears 91 and 83 before the pivoted press head 9 is again unlocked, and it will be obvious that upon subsequent downward movement of the links 13, to unlock the head 9 and swing it upwardly and rearwardly to normal position, the screw 164 will move downwardly to its normal position shown in Figs. 1 and 3 and the weight 162 will restore the latch bolt 156 to locking position under the lever 89.

A suitable cut-off valve 165 may be provided in the main supply pipe 22 for isolating the pressure supply tank T from the remainder of the apparatus. Throttle valves 166 and 167 in the pipe lines 55 and 65, respectively, may be employed to control the rate of flow of fluid to and from the upper end of cylinder 21 to thereby control the speed of operation of the swinging and locking mechanism for the press head 9.

*Modified construction shown in Figs. 18 to 21.*

In Figs. 18 to 21 a modified form of apparatus is shown whereby pressure fluid is supplied to the ram cylinder 3 from low and high pressure tanks. Except for the changes shown in these views, the construction and operation of the apparatus as a whole is the same as that above described.

In this construction a supply of liquid L at relatively low pressure is maintained in tank T, and an additional tank T' is provided in which a supply of liquid L at relatively high pressure is maintained. A control valve device 24ª is substituted for the control valve device 24 and contains a low pressure supply valve 170, a high pressure supply valve 171, and an exhaust valve 172. Three cams are provided on shaft 49 for operating these valves. The supply pipe 22 is connected with tank T and has the same branch pipes connected with the same parts as in the other form of press above described.

Pipe 22 leads to a port 173 in valve casing 24ª which opens into the low-pressure supply valve chamber 174, communication between which chamber and a lower chamber 176 via a vertical passage 175, is normally closed by valve 170. A passage 177 connects chamber 176 with a higher check valve chamber 178 in which is a check valve 179 normally closing the upper end of passage 177 to prevent flow of fluid from chamber 178 to chamber 176. The pipe 29 leads from the ram cylinder port 31 to a passage 180 in valve casing 24ª leading to the exhaust valve chamber 181, which chamber is connected by a vertical passage 182 with the outlet chamber 183. The waste pipe 35 is connected with exhaust port 184 which leads from said pipe into chamber 183. Valve 172 is normally unseated to open communication between chambers 181 and 183 via passage 182. A passage 185, connecting check valve chamber 178 with a chamber 186, intersects and communicates with passage 180. Chamber 186 is located under the high pressure supply valve chamber 187 and connected therewith by a vertical passage 188 normally closed by valve 171. A port 189 leads from valve chamber 187 and is connected by a high pressure supply pipe 168 with the high pressure fluid supply tank T'. A suitable cut-off valve 169 may be provided in pipe 168.

The valves 170, 171 and 172 are adapted to be unseated by means of plungers 190, 191, and 192, normally urged downwardly by suitable coiled springs and adapted to be lifted by tappets 193, 194 and 195 pivoted on standard 51, the tappets carrying contact rollers 196, 197 and 198 which ride on the peripheries of actuating cams on shaft 49, all in the same manner as in the apparatus shown in Figs. 1 to 17.

The exhaust valve actuating cam 201 has a short high point 201ª normally engaged under roller 198 on actuating tappet 195 to hold unseated the exhaust valve 172, as shown in Figs. 18, 19 and 21. The low pressure valve actuating cam 199 has a short high-point 199ª adapted to ride under roller 196 on the low pressure valve actuating tappet 193 immediately after roller 198 drops off the high-point of cam 201 and hold valve 170 unseated for a short period during the single revolution of shaft 49 immediately following closing of the exhaust valve 172. Actuating cam 200 for the high pressure valve 171 has a long high-point 200ª extending from a point intersecting the following edge of high-point 199ª of cam 199 (in counter-clockwise direction around the cam as viewed in Fig. 19) to a point in advance of the leading edge of the high-point 201ª of cam 201 preferably arranged as shown, so that said high point 200ª will engage under roller 197 and unseat valve 171 before valve 170 is lowered to its seat by roller 196 dropping down on the low point of cam 199. The opening of valve 171 connects high pressure tank T' with the ram cylinder 3 before communication is closed between tank T and the ram cylinder, so that the pressure in said cylinder is stepped up without any cessation of the flow of pressure fluid thereto. As the high pressure fluid flows to the ram cylinder it will also flow to check valve chamber 178, via passage 185, and the check valve 179 will immediately seat to prevent flow of high pressure toward the low pressure tank past valve 170 before said valve 170 is fully seated. The roller 197 rides off the high portion 200ª of cam 200 near the end of the single revolution of shaft 49 before high point 201ª of cam 201 again lifts roller 198 to open exhaust valve 172 as the shaft 49 completes its revolution.

It will be understood that the apparatus as a whole, and its several parts, are susceptible of other modifications within the scope of my invention, and that some of my improvements may be employed without the others.

What I claim is:

1. In an apparatus of the class set forth, the combination of a horizontally disposed and vertically reciprocable lower press head; an upper press head supported to swing about a horizontal axis into and out of a horizontal position above the lower press head; means for swinging said upper head about said axis; means operable by said upper head swinging means for locking the upper head in horizontal position and releasing said head; means operable automatically to effect a single up and down movement of the lower head upon a locking operation of the upper head locking means; and controlling means for said head-swinging means, operable manually to cause the head-swinging means to operate to swing the upper head into horizontal position and cause a locking operation of said locking means, and operable automatically, upon return of the lower head to its normal lowered position, to cause said head-swinging means to operate to release said locking means and swing the upper head out of horizontal position.

2. In an apparatus of the class set forth, the combination of a pivoted press head; a reciprocable press head; power-operated means for swinging the pivoted head into and out of parallelism with the reciprocable head; power-operated means for reciprocating the reciprocable head; means for automatically effecting an operation of said head-reciprocating means after movement of the pivoted head into parallelism with the reciprocable head; control means for said head-swinging means, operable manually to cause the head-swinging means to move the pivoted head into parallelism with the reciprocable head, and operable automatically, by retraction of the reciprocable head from the pivoted head, to cause said head-swinging means to move the pivoted head out of parallelism with the reciprocable head.

3. In an apparatus of the class set forth, the combination of a pivoted press head; a reciprocable press head; fluid-pressure-operated means for swinging the pivoted head into and out of parallelism with the reciprocable head; fluid-pressure-operated means for reciprocating the reciprocable head; means operating automatically, upon movement of the pivoted head into parallelism with the reciprocable head, to first supply pressure fluid to the head-reciprocating means and then exhaust pressure fluid therefrom; control means for said head-swinging means operating automatically by the retraction of the reciprocable head, upon exhaust of pressure fluid from the head-reciprocating means, to cause the head-swinging means to swing the pivoted head out of parallelism with the reciprocable head; and manually operable means for actuating the control means to cause movement of the pivoted head into parallelism with the reciprocable head.

4. In an apparatus of the class set forth, the combination of a pivoted press head; a reciprocable press head; fluid-pressure-operated means for swinging the pivoted head into and out of parallelism with the reciprocable head; fluid-pressure-operated means for reciprocating the reciprocable head; controlling means operating automatically, when put into action, to first cause movement of the pivoted head into parallelism with the reciprocable head the final movement of the pivoted head-moving means automatically operating to then cause movement of the reciprocable head first toward and then away from the pivoted head, and finally the movement of the reciprocable head to retracted position automatically operating means to cause movement of the pivoted head out of parallelism with the reciprocable head; and means for putting said controlling means into action.

5. In an apparatus of the class set forth, the combination of a pair of dies supported for relative pivotal movement therebetween into and out of parallelism and for relative approaching and receding movement therebetween in parallelism; means for bringing the dies into parallelism; means for automatically maintaining said dies under pressure for a predetermined time while in parallelism and then relieving the dies of pressure; and means operated by said last-mentioned means when the dies are relieved of pressure for automatically causing the first-mentioned means to effect a relative pivotal separating movement between the dies when pressure is relieved on the dies.

6. In an apparatus of the class set forth, the combination of a pair of co-operating dies; fluid-pressure-operated means for subjecting the dies to pressure; valve means for controlling the supply of pressure fluid to said fluid-pressure-operated means and the exhaust of pressure fluid therefrom; cam means for causing first a fluid supply and then a fluid exhaust operation of said valve means; constantly running driving means normally disconnected from said cam means; means for establishing a driving connection between said driving means and cam means; and means for automatically breaking said driving connection when said cam means actuates the valve means to exhaust pressure fluid from the fluid-pressure-operated means.

7. In an apparatus of the class set forth, the combination of a pair of co-operating dies; fluid-pressure-operated means for subjecting the dies to pressure; valve means for controlling the supply of pressure fluid to said fluid-pressure-operated means and the exhaust of pressure fluid therefrom; cam means for causing first a fluid supply and then a fluid exhaust operation of said valve means; constantly running driving means normally disconnected from said cam means; and manually controlled power-operated means for establishing a driving connection between said driving means and cam means and automatically breaking said connection upon actuation of the valve means by the cam means to exhaust pressure fluid from the fluid-pressure-operated means.

8. In an apparatus of the class set forth, the combination of a pair of co-operating press heads; fluid-pressure-operated means for forcing one of said heads toward the other head; valve means for controlling the supply of pressure fluid to and the exhaust thereof from said fluid-pressure-operated means; cam means for actuating said valve means to first establish and maintain for a predetermined time a fluid supply and then to establish a fluid exhaust; constantly running driving means for the cam means; means for effecting a driving connection between the driving means and cam means at will; and means for automatically breaking said connection when the valve means is actuated by the cam means to establish a fluid exhaust from the fluid-pressure-operated means.

9. In an apparatus of the class set forth, the combination of a pair of co-operating press heads; fluid-pressure-operated means for forcing one of said heads toward the other head; valve means for controlling the supply of pressure fluid to and the exhaust thereof from said fluid-pressure-operated means; cam means for actuating said valve means to first establish and maintain for a predetermined time a fluid supply and then to establish a fluid exhaust; constantly running driving means for the cam means; power-operated means for establishing a driving connection between the cam means and driving means and automatically breaking said connection after a single cycle of operation of the cam means; and manually-operable means for putting said power-operated means into action.

10. In an apparatus of the class set forth, the combination of a pivoted press head; a reciprocable press head; fluid-pressure-operated means for swinging the pivoted head into and out of parallelism with the reciprocable head; a second fluid-pressure-operated means for reciprocating the reciprocable head; valve means operable manually to cause the first-mentioned fluid-pressure-operated means to swing the pivoted head into parallelism with the reciprocable head; a second valve means controlling supply of pressure fluid to and exhaust thereof from the second fluid-pressure-operated means; cam means for causing first a fluid supply and then a fluid exhaust operation of the second valve means; constantly running driving means for said cam means; means for automatically establishing a driving connection between the driving means and cam means upon movement of the pivoted head into parallelism with the reciprocable head; means for automatically breaking said connection upon a fluid exhaust operation of the second valve means; and means for automatically actuating the first valve means, following an exhaust operation of the second valve means, to thereby cause the first-mentioned fluid-pressure-operated means to swing the pivoted head out of parallelism with the reciprocable head.

11. In an apparatus of the class set forth, the combination of a vertically reciprocable and horizontally disposed lower die-carrying head; an upper die-carrying head pivotally supported to swing about a fixed horizontal axis into and out of parallelism and vertical register with the lower head; upper and lower co-operating dies carried by the respective heads; means for swinging said upper head about its axis; means for reciprocating the lower head; means operable by said upper head swinging means for locking said head in parallelism with the reciprocable head and releasing said head; means controlled by a locking operation of said locking means for causing said lower head reciprocating means to act to effect a single up and down movement of the lower head; means controlled by return of the lower head for causing said upper head swinging means to unlock said upper head and swing the same upwardly about its axis; and means for causing said upper head swinging means to lower and lock said head.

12. In an apparatus of the class set forth, the combination of a vertically reciprocable and horizontally disposed lower die-carrying head; an upper die-carrying head pivotally supported to swing about a fixed horizontal axis into and out of parallelism and vertical register with the lower head; upper and lower co-operating dies carried by the respective heads; means for swinging said upper head about its axis; means for reciprocating the lower head; means operable by said upper head swinging means for locking said head in parallelism with the reciprocable head and releasing said head, manually operable means for causing said head swinging means to swing the upper head into parallelism with the lower head; means controlled by a locking operation of the upper head locking means for causing said lower head reciprocating means to effect a single up and down movement of the lower head; means controlled by the return movement of the lower head for actuating said manually operable means to cause an upward swing of the upper head by said head swinging means.

13. In an apparatus of the class set forth, the combination of a pair of press heads; hydraulic ram means for effecting a pressing operation by the heads; valve means for controlling the supply of liquid under pressure to and the exhaust thereof from the hydraulic ram means; power-driven means for actuating said valve means to establish and maintain for a predetermined time a supply of liquid to said ram means and then exhaust liquid from the ram means; a weight for putting said power-driven means into action; releasable means for holding said weight out of action; means for releasing said weight for action; means controlled by said ram means for re-setting said weight during a pressing action of the heads; a weight normally tending to put said power-driven means out of action; and means controlled by said power-driven means for preventing the last-mentioned weight from acting to put the power-driven means out of action until said power-driven means has acted on the valve means to establish a liquid exhaust from the ram means.

14. In an apparatus of the class set forth, the combination of a pair of press heads; hydraulic ram means for effecting a pressing operation by the heads; valve means for controlling the supply of liquid under pressure to and the exhaust thereof from the ram means; rotary cam means for actuating the valve means to establish and maintain for a predetermined time a supply of liquid to the ram means and then establish an exhaust for liquid from the ram means; constantly running driving means for the cam means; means for connecting and disconnecting the driving and cam means; a weight carried by said connecting and disconnecting means normally holding the same in disconnecting position; a second weight adapted to act on the connecting and disconnecting means to move the same to connecting position; releasable means for holding the second weight out of action; means for releasing the second weight; means for automatically resetting the second weight during a pressing action of said heads; and means for locking the connecting and disconnecting means in connecting position against the pull of the first weight during a single cycle of operation of the rotary cam means and then automatically unlocking said connecting and disconnecting means.

15. In an apparatus of the class set forth, the combination of a horizontally disposed lower die-carrying head; fluid pressure operated ram means for raising and lowering said lower head; an upper die-carrying head; a fixed frame; means pivotally holding said upper head at one edge thereof to said frame to swing from a normal upstanding position downwardly into parallelism with the lower head; a cylinder; a piston in said cylinder having differential pressure faces; a movable latch member carried by said upper head; means on said frame cooperating with said upper head and latch member for rigidly holding the upper head in parallelism with the lower head; means connecting said piston with said latch member and upper head to first lower the upper head and then move the latch member to locking position upon movement of said piston in one direction, and to first move the latch member to unlocking position and then lift the upper head when said piston is moved in the opposite direction; a source of fluid pressure; a constantly open connection between said source of pressure and one end of said cylinder for maintaining pressure on the smaller face of said piston; valve controlled means for connecting the other end of said cylinder alternately with an exhaust and said source of pressure; and valve controlled means for alternately connecting said ram means with said source of pressure and an exhaust.

16. In an apparatus of the class set forth, the combination of a source of liquid under pressure; a press frame; a vertical ram cylinder in said frame; a ram in said cylinder; a lower press head supported on said ram; an upper press head hinged at one edge to said frame to swing about a horizontal axis downwardly into parallelism with the lower press head and upwardly into an upstanding position; means on said frame cooperating with said upper head to arrest and support the same in horizontal position; a movable latch member held to the upper head and adapted to cooperate with said frame when in locking position to prevent upward swinging of the head; a second vertical cylinder on said frame; a differential piston in said cylinder having its smaller pressure area at its lower end; means forming a constantly open connection between said source of pressure and the lower end of said second cylinder; means connecting the upper end of said second cylinder with said source of pressure and an exhaust; means connecting the lower end of the ram cylinder with said source of pressure and an exhaust; and valve devices for controlling the supply of liquid under pressure to and exhaust thereof from the lower end of the ram cylinder and the upper end of the second cylinder.

17. In an apparatus of the class set forth, the combination of a source of liquid under pressure; a press frame; a vertical ram cylinder in said frame; a ram in said cylinder; a lower press head supported on said ram; an upper press head hinged at one edge to said frame to swing about a horizontal axis downwardly into parallelism with the lower press head and upwardly into an upstanding position; means on said frame cooperating with said upper head to arrest and support the same in horizontal position; a movable latch member held to the upper head and adapted to cooperate with said frame when in locking position to prevent upward swinging of the head; a second vertical cylinder on said frame; a differential piston in said cylinder having its smaller pressure area at its lower end; means forming a constantly open connection between said source of pressure and the lower end of said second cylinder; means connecting the upper end of said second cylinder with said source of pressure and an exhaust; means connecting the lower end of the ram cylinder with said source of pressure and an exhaust; valve means in the connection to the upper end of the second cylinder operable manually to shut off the flow of liquid from said source to said cylinder end and open said cylinder end to the exhaust; automatically operated valve means in the connection to the ram cylinder, put into action by a locking movement of the latch member, and operating to first close the exhaust from said ram cylinder and permit liquid to flow from said source to said cylinder and, then, to shut off the flow of liquid to said cylinder and open the cylinder to the exhaust; and means operable by return of the lower head for actuating the manually operable valve means to shut off the exhaust from the upper end of the second cylinder and permit liquid to flow to said cylinder end from said source.

18. In an apparatus of the class set forth, the combination of a reciprocable die-carrying head; a pivoted die-carrying head; fluid-pressure-operated means for swinging the pivoted head into and out of register with the reciprocable head; means for reciprocating the reciprocable head; and a control valve device for said fluid-pressure-operated means operable manually to cause movement of the pivoted head into register with the reciprocable head and automatically operable by return movement of the reciprocable head to cause movement of the pivoted head out of register with the reciprocable head.

19. In an apparatus of the class set forth, the combination of a pair of dies for compressing and shaping masses of plastic material; power-operated means for normally supporting said dies with their cooperating faces disposed respectively horizontally and at an angle to the horizontal and operable, when put into action, to cause the dies to compress material supported on the horizontal die face first with a jaw action and then with a final compressing and shaping action during which the dies have a relative movement in a vertical plane, said power-operated means holding the dies in the final compressing position for a predetermined time interval and then retracting one of the dies of the pair and then said retracted die at the completion of the retracting movement automatically setting in motion the means to restore the dies to their normal separated angularly disposed positions; and manually operable means for initiating an operation of said power-operated means at will.

20. In an apparatus of the class set forth, the combination of a horizontally disposed upwardly facing and vertically reciprocable die-carrier; fluid-pressure-operated ram means for raising and lowering said upwardly facing die-carrier; means for supplying pressure fluid to said ram means to raise said upwardly facing die-carrier, maintaining said supply for a predetermined time interval and, finally, relieving the pressure on the ram means; a second die-carrier pivotally supported to swing about a horizontal axis located above the horizontal plane of the upward facing die-carrier; a second fluid-pressure operated means for swinging said second carrier about its axis into and out of parallelism with the upwardly facing carrier and normally holding said second carrier in an upwardly swung position; control means for said second fluid-pressure-operated means operable manually to cause a downward swinging movement of the second carrier into parallelism with the upwardly facing carrier and operable automatically, upon relief of pressure from said ram means, to cause an upward swinging movement of the second carrier to normal position.

21. In an apparatus of the class set forth, the combination of a horizontally disposed upwardly facing and vertically reciprocable die-carrier; fluid-pressure-operated ram means for raising and lowering said upwardly facing die-carrier; means for supplying pressure fluid to said ram means to raise said upwardly facing die-carrier, maintaining said supply for a predetermined time interval and, finally relieving the pressure on the ram means; a second die-carrier pivotally supported to swing about a horizontal axis located above the horizontal plane of the upward facing die-carrier; a second fluid-pressure operated means for swinging said second carrier about its axis into and out of parallelism with the upwardly facing carrier and normally holding said second carrier in an upwardly swung position; control means for said second fluid-pressure-operated means operable manually to cause a downward swinging movement of the second carrier into parallelism with the upwardly facing carrier and operable automatically, upon relief of pressure from said ram means, to cause an upward swinging movement of the second carrier to normal position; and means whereby said means for supplying pressure fluid to and relieving pressure on the ram means is automatically put into action upon a downward swinging movement of the second carrier.

22. In an apparatus of the class set forth, the combination of a horizontally disposed upwardly facing and vertically reciprocable die-carrier; fluid-pressure-operated ram means for raising and lowering said upwardly facing die-carrier; means for supplying pressure fluid to said ram means to raise said upwardly facing die-carrier, maintaining said supply for a predetermined time interval and, finally, relieving the pressure on the ram means; a second die-carrier pivotally supported to swing about a horizontal axis located above the horizontal plane of the upward facing die-carrier; a second fluid-pressure operated means for swinging said second carrier about its axis into and out of parallelism with the upwardly facing carrier and normally holding said second carrier in an upwardly swung position; control means for said second fluid-pressure-operated means operable manually to cause a downward swinging movement of the second carrier into parallelism with the upwardly facing carrier and operable automatically, upon relief of pressure from said ram means, to cause an upward swinging movement of the second carrier to normal position; means whereby said means for supplying pressure fluid to and relieving pressure on the ram means is automatically put into action upon a downward swinging movement of the second carrier; and means for locking the second carrier in parallelism with the upwardly facing carrier controlled by said second fluid-pressure-operated means.

23. In an apparatus of the class set forth, the combination of a horizontally disposed upwardly facing and vertically reciprocable die-carrier; fluid-pressure-operated ram means for raising and lowering said upwardly facing die-carrier; means for supplying pressure fluid to said ram means to raise said upwardly facing die-carrier, maintaining said supply for a predetermined time interval and, finally, relieving the pressure on the ram means; a second die-carrier pivotally supported to swing about a horizontal axis located above the horizontal plane of the upward facing die-carrier; a second fluid-pressure operated means for swinging said second carrier about its axis into and out of parallelism with the upwardly facing carrier and normally holding said second carrier in an upwardly swung position; control means for said second fluid-pressure-operated means operable manually to cause a downward swinging movement of the second carrier into parallelism with the upwardly facing carrier and operable automatically, upon relief of pressure from said ram means, to cause an upward swinging movement of the second carrier to normal position; means whereby said means for supplying pressure fluid to and relieving pressure on the ram means is automatically put into action upon a downward swinging movement of the second carrier; and safety-locking means controlled by said second fluid-pressure-operated means for preventing operation of the pressure supply and relief means for the ram means when the second carrier is out of parallelism with the upwardly facing carrier.

24. In an apparatus of the class set forth, the combination of a vertically reciprocable lower press head; an upper press head pivotally supported to swing about a fixed horizontal axis into and out of parallelism with the lower head; means for swinging said upper head; means for reciprocating the lower head; and means controlled by said upper head swinging means for preventing operation of said lower head reciprocating means when the upper head is out of parallelism with the lower head.

25. In an apparatus of the class set forth, the combination of a vertically reciprocable lower press head; an upper press head pivotally supported to swing about a fixed horizontal axis into and out of parallelism with the lower head; means for swinging said upper head; means for reciprocating the lower head; means controlled by said upper head swinging means for preventing operation of said lower head reciprocating means when the upper head is out of parallelism with the lower head; control means manually operable to cause said upper head swinging means to move the upper head into parallelism with the lower head; means operating automatically upon movement of the upper head into parallelism with the lower head for causing a single up-and-down movement of the lower head by its reciprocating means; and means operable automatically, upon return movement of the lower head, for actuating said manually operable control means to cause the upper head swinging means to move the upper head out of parallelism with the lower head.

26. In an apparatus of the class set forth, the combination of a vertically reciprocable lower press head; an upper press head pivotally supported to swing about a fixed horizontal axis into and out of parallelism with the lower head; means for swinging said upper head; means for reciprocating the lower head; means controlled by said upper head swinging means for preventing operation of said lower head reciprocating means when the upper head is out of parallelism with the lower head; control means manually operable to cause said upper head swinging means to move the upper head into parallelism with the lower head; means operating automatically upon movement of the upper head into parallelism with the lower head for causing a single up-and-down movement of the lower head by its reciprocating means; means operable automatically, upon return movement of the lower head, for actuating said manually operable control means to cause the upper head swinging means to move the upper head out of parallelism with the lower head; and latch means controlled by the upper head swinging means for locking the upper head against swinging movement during reciprocation of the lower head.

27. In an apparatus for forming articles by pressure, the combination of a pivoted upper press head; a vertically reciprocable lower press head; complementary article-shaping devices carried by said heads; and manually-controlled power-operated means operating automatically when put into action, to first swing the pivoted head into parallelism with the reciprocable head, then subject the reciprocable head to lifting force of fluid first at low pressure and then at high pressure, then relieve the pressure on said reciprocable head to permit return of the head to normal position, the lower press head on its return to normal position automatically operating means to finally swing the pivoted head out of parallelism with the reciprocable head.

28. In an apparatus of the class set forth, the combination of a pivotally supported upper press head; a vertically reciprocable lower press head; fluid-pressure-operated means for forcing said lower head upward; pressure fluid supply and exhaust means operable automatically to maintain lifting pressure in said head forcing means for a predetermined time interval and automatically step up the pressure in said head-forcing means during said time interval and finally exhaust pressure fluid from said head-forcing means; a second fluid-pressure-operated means for swinging the upper head into and out of parallelism with the lower head; control means operable manually to cause said second fluid-pressure-operated means to swing the upper head into parallelism with the lower head and operable automatically by return of the lower head to cause said second fluid-pressure-operated means to swing the upper head out of parallelism with the lower head; and means for putting said automatic fluid supply and exhaust means into action when the upper head is brought into parallelism with the lower head.

29. In an apparatus of the class set forth, the combination of a vertically reciprocable lower press head; a pivotally supported upper press head movable into and out of parallelism with the lower head; means for locking the upper head in parallelism with the lower head; fluid-pressure-operated means for raising the lower head; and means, put into action by a locking movement of the pivoted head locking means, for first supplying pressure fluid to said lower head raising means and then exhausting the pressure fluid therefrom.

30. In an apparatus of the class set forth, the combination of a pivotally supported upper press head; a vertically reciprocable lower press head; fluid-pressure-operated means for raising the lower head; pressure fluid supply and exhaust means operating automatically, when put into action, to first supply pressure fluid to said lower head raising means and then exhaust pressure fluid therefrom; a second fluid-pressure-operated means for swinging the upper head into and out of parallelism with the lower head; a hand lever pivoted on a vertical axis to swing relatively to the lower head and move up and down in unison with said head; a control valve device for the upper head swinging means having an operating handle manually shiftable upward to a position for causing said head swinging means to swing the upper head into parallelism with the lower head; and means for normally urging said hand lever about its pivot to a position for engaging and depressing the operating handle of said valve device, upon return of the lower head, to a position for causing the head-swinging means to swing the upper head out of parallelism with the lower head, said hand lever being manually shiftable about its pivot to permit manual upward shifting of the operating handle of said control valve device.

31. In a power-operated press, the combination of a pivoted press head, a reciprocable press head, power-operated means for swinging said pivoted head into and out of cooperative relation with the reciprocable head, a control device for said power-operated means including an operating handle movable to one position to cause movement of the pivoted head into cooperative relation with the reciprocable head and to another position to cause movement of the pivoted head out of cooperative relation with the reciprocable head, a safety handle carried by the reciprocable head and shiftable relatively thereto, and means for normally urging said safety handle into a position in which it will shift the operating handle to its second-mentioned position upon movement of the reciprocable head away from the pivoted head and prevent movement of the operating handle to its first-mentioned position until said safety handle is manually shifted relatively to the reciprocable head, and automatic power-operated means for causing the reciprocable head to move first toward and then away from the pivoted head upon movement of the pivoted head into cooperative relation with the reciprocable head.

32. In a power-operated press, a reciprocable head, power-operated means for causing a single up and down movement of said head, a control handle pivoted on a horizontal axis and upward swinging of which from normal position causes first an upward movement and then a downward movement of said head by said power-operated means, a safety handle pivoted on a vertical axis to move bodily up and down with said head and swing horizontally relatively to said head, and a spring for normally urging said safety handle about its pivot to a position in which the safety handle is adapted to restore the control handle to normal position upon downward movement of the head and prevent upward swinging of the control handle until the safety handle is rocked about its pivot against the action of said spring.

33. In a fluid-pressure-operated molding apparatus, a ram cylinder, a ram in said cylinder, a press head movable by the ram, a cooperating press head, a valve device, power-operated actuating means for causing the valve device to act to connect the ram cylinder with a pressure fluid inlet for a predetermined time interval and then connect said cylinder with a pressure fluid outlet, and manually-controlled means for rendering said power-operated means effective for a single operation and then automatically rendering said means ineffective.

34. In a fluid-pressure-operated molding apparatus, a ram cylinder, a ram in said cylinder, a press head movable by the ram, a cooperating press head, a valve device, actuating means for causing said valve device to act to connect said cylinder alternately with a pressure fluid inlet and a pressure fluid outlet, a constantly-running driving means, means for connecting said driving means with said actuating means at will, and means whereby said connection is automatically broken when the actuating means causes the valve device to connect the ram cylinder with the fluid outlet.

35. In an apparatus of the class set forth, the combination of a pair of co-operating press heads; fluid-pressure-operated means for forcing one of said heads toward the other head; valve means for controlling the supply of pressure fluid to and the exhaust thereof from said fluid-pressure-operated means; means for actuating said valve means to first establish and maintain for a predetermined time a fluid supply and then to establish a fluid exhaust; means for operating the valve actuating means; means adapted to be operated when one of said press heads is in pressing position for establishing an effective operative connection between the valve actuating means and the operating means therefor, and automatically breaking said connection after a single cycle of operation of the valve actuating means; and manually-operable means for putting the apparatus in operation for a single cycle of movements.

36. In an apparatus of the class set forth, the combination of a pivoted press head; a reciprocable press head; fluid-pressure-operated means for swinging the pivoted head into and out of parallelism with the reciprocable head; a second fluid-pressure-operated means for reciprocating the reciprocable head; valve means operable manually to cause the first-mentioned fluid-pressure-operated means to swing the pivoted head into parallelism with the reciprocable head; a second valve means controlling supply of pressure fluid to and exhaust thereof from the second fluid-pressure-operated means; means for causing first a fluid supply and then a fluid exhaust operation of the second valve means; power operated means for actuating the said second valve means; means for automatically establishing an operative connection for a predetermined time interval between the power-operated means and the second valve means upon movement of the pivoted head into parallelism with the reciprocable head and then automatically breaking said connection; and means for automatically actuating the first valve means, following an exhaust operation of the second valve means, to thereby cause the first-mentioned fluid-pressure-operated means to swing the pivoted head out of parallelism with the reciprocable head.

37. In an apparatus of the class set forth, the combination of a pivoted press head; a reciprocable press head; fluid-pressure-operated means for swinging the pivoted head into and out of parallelism with the reciprocable head; a second fluid-pressure-operated means for reciprocating the reciprocable head; valve means operable manually to cause the first-mentioned fluid-pressure-operated means to swing the pivoted head into parallelism with the reciprocable head; a second valve means controlling supply of pressure fluid to and exhaust thereof from the second fluid pressure-operated means; cam means for causing first a fluid supply and then a fluid exhaust operation of the second valve means; constantly running driving means for said cam means; means for automatically establishing a driving connection for a predetermined time interval between the driving means and cam means upon movement of the pivoted head into parallelism with the reciprocable head and then automatically breaking said connection; and means for automatically actuating the first valve means, following an exhaust operation of the second valve means, to thereby cause the first-mentioned fluid-pressure-operating means to swing the pivoted head out of parallelism with the reciprocable head.

38. In an apparatus of the class set forth, the combination of a pivoted press head; a reciprocable press head; means for swinging the pivoted head into and out of parallelism with the reciprocable head; a latch to lock the pivoted head in position parallel with the reciprocable head; means to operate the said latch; a fluid-pressure-operated means for reciprocating the reciprocable head; a valve means controlling supply of pressure fluid to and exhaust thereof from the said fluid-pressure-operated means; cam means for causing first a fluid supply and then a fluid exhaust operation of the said valve means; constantly running driving means for said cam means; and means for establishing a driving connection for a predetermined time interval between the driving means and cam means upon a locking movement of the said latch means, and then automatically breaking said connection.

39. In an apparatus of the class set forth, the combination of a pivoted press head; a reciprocable press head; fluid-pressure-operated means for swinging the pivoted head into and out of parallelism with the reciprocable head; a second fluid-pressure-operated means for reciprocating the reciprocable head; valve means operable manually to cause the first-mentioned fluid-pressure-operated means to swing the pivoted head into parallelism with the reciprocable head; a second valve means controlling supply of pressure fluid to and exhaust thereof from the second fluid-pressure-operated means; means for causing first a fluid supply at a low pressure and then a fluid supply at a high pressure and finally a fluid exhaust operation of the second valve means; power-operated means for actuating the said second valve means; means for automatically establishing an operative connection for a predetermined time interval between the power-operated means and the second valve means upon movement of the pivoted head into parallelism with the reciprocable head and then automatically breaking said connection; and means for automatically actuating the first valve means following an exhaust operation of the second valve means to thereby cause the first-mentioned fluid-pressure operated means to swing the pivoted head out of parallelism with the reciprocable head.

40. In an apparatus of the class set forth, the combination of a pivoted press head; a reciprocable press head; means for swinging the pivoted head into and out of parallelism with the reciprocable head; a latch to lock the pivoted head in position parallel with the reciprocable head; means to operate the said latch; a fluid-pressure-operated means for reciprocating the reciprocable head; a valve means controlling supply of pressure fluid to and exhaust thereof from the said fluid-pressure-operated means; means for causing first a fluid supply and then a fluid exhaust operation of the said valve means; power operated means for actuating the valve means; and means for automatically establishing an operative connection for a predetermined time interval between the power-operated means and the said valve means upon a locking movement of the said latch and then automatically breaking said connection.

41. In an apparatus of the class set forth, the combination of a pivoted press head; a reciprocable press head; means for swinging the pivoted head into and out of parallelism with the reciprocable head; a fluid pressure operated means for reciprocating the reciprocable head; means operable manually to cause the first-mentioned means to swing the pivoted head into parallelism with the reciprocable head; a valve means controlling supply of pressure fluid to and exhaust thereof from the fluid-pressure-operated means; means for causing first a fluid supply and then a fluid exhaust operation of the said valve means; power-operated means for said valve means; means for automatically establishing an operative connection for a predetermined time interval between the power-operated means and the said valve means upon movement of the pivoted head into parallelism with the reciprocable head and then automatically breaking said connection; and means for automatically setting in operation the pivoted head swinging means by the retraction of the reciprocable head to thereby swing the pivoted head out of parallelism with the reciprocable head and then hold it stationary until a further actuation of the said manually operable means.

In testimony whereof I hereunto affix my signature.

HUBBARD D. NITCHIE.